(12) United States Patent
Nakayama

(10) Patent No.: US 11,165,566 B2
(45) Date of Patent: Nov. 2, 2021

(54) COMPUTER-READABLE RECORDING MEDIUM, TERMINAL DEVICE, AND TERMINAL CONTROLLING METHOD FOR DETERMINING SERVICE PROVIDER RELIABILITY

(71) Applicant: Yahoo Japan Corporation, Tokyo (JP)

(72) Inventor: Kazuki Nakayama, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 332 days.

(21) Appl. No.: 16/272,933

(22) Filed: Feb. 11, 2019

(65) Prior Publication Data
US 2019/0296899 A1    Sep. 26, 2019

(30) Foreign Application Priority Data
Mar. 20, 2018   (JP) .............................. JP2018-053521

(51) Int. Cl.
| G06F 21/64  | (2013.01) |
| G06F 21/60  | (2013.01) |
| H04L 9/08   | (2006.01) |
| H04L 29/08  | (2006.01) |
| G06F 16/955 | (2019.01) |
| H04L 9/32   | (2006.01) |
| H04L 9/00   | (2006.01) |
| H04L 7/10   | (2006.01) |
| H04L 9/12   | (2006.01) |

(52) U.S. Cl.
CPC ........ H04L 9/0822 (2013.01); G06F 16/9566 (2019.01); H04L 9/006 (2013.01); H04L 9/32 (2013.01); H04L 67/02 (2013.01)

(58) Field of Classification Search
None
See application file for complete search history.

(56) References Cited

U.S. PATENT DOCUMENTS

| 8,327,254  | B2 * | 12/2012 | Chen ................... G06Q 30/0269 715/208 |
| 8,605,097  | B1 * | 12/2013 | Wyatt .............. H04N 21/44231 345/520 |
| 8,744,081  | B2 * | 6/2014  | Christison ........ H04N 21/43637 380/270 |
| 10,225,238 | B2 * | 3/2019  | Song ....................... G06F 21/10 |

(Continued)

FOREIGN PATENT DOCUMENTS

| JP | 2017-515219 A | 6/2017 |
| WO | 2015/153168 A1 | 10/2015 |

*Primary Examiner* — Venkat Perungavoor
(74) *Attorney, Agent, or Firm* — Procopio, Cory, Hargreaves & Savitch LLP

(57) ABSTRACT

A non-transitory computer-readable recording medium includes instructions that cause a computer to execute a process that includes receiving, from a server of a second provider that provides a service for supporting a delivery of a content performed by a first provider, encrypted information along with the content. The first provider encrypts information on the service to obtain the encrypted information. The process also includes attempting decoding the encrypted information, which is received in the receiving, by using a decoding key that is provided by the first provider and determining reliability of the service based on a decoded result in the decoding.

18 Claims, 6 Drawing Sheets

(56) References Cited

U.S. PATENT DOCUMENTS

| | | | |
|---|---|---|---|
| 2002/0083178 A1* | 6/2002 | Brothers | G06F 21/10 709/226 |
| 2004/0236962 A1* | 11/2004 | Wong | H04L 63/168 726/3 |
| 2008/0181414 A1* | 7/2008 | Deaver | H04N 21/4623 380/279 |
| 2012/0275597 A1* | 11/2012 | Knox | H04N 21/8586 380/210 |
| 2013/0125202 A1* | 5/2013 | Sprague | G06F 21/00 726/1 |
| 2013/0125247 A1* | 5/2013 | Sprague | H04L 63/0428 726/28 |
| 2015/0195256 A1* | 7/2015 | Swaminathan | H04L 9/08 713/171 |
| 2018/0091495 A1* | 3/2018 | Lu | G06F 21/62 |
| 2018/0234401 A1* | 8/2018 | Cates | H04L 9/0894 |
| 2019/0044995 A1* | 2/2019 | Amidei | H04N 21/63345 |

* cited by examiner

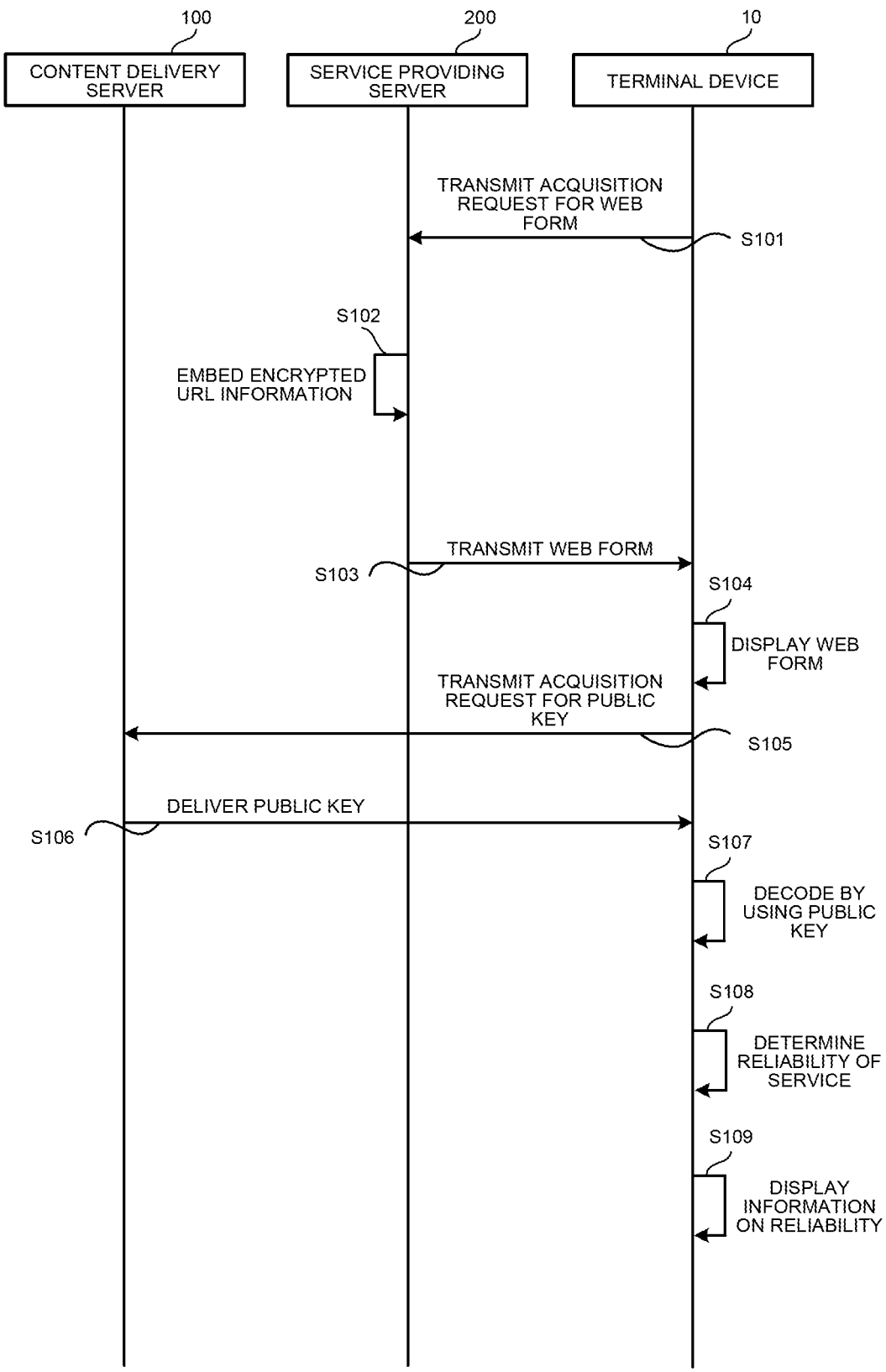

FIG.7

```
┌─────────────────────────────────┐
│ ┌──────────────┬─────────────┐  │
│ │ http://BBB.jp/│ DETAILED   │  │──T10
│ │              │ INFORMA-   │  │
│ │              │ TION       │  │
│ ├──────────────┴─────────────┤  │
│                                 │──13
│        【AAA COMPANY】          │
│                                 │
│   CARD-NUMBER INPUTTING SCREEN  │
│                                 │
│   "*" IS REQUIRED ITEM          │
│                                 │
│   * CARD TYPE   ┌────┐          │
│                 └────┘          │
│                                 │
│   * CARD TYPE   ┌──────────┐    │
│                 └──────────┘    │
│                                 │
│   * EXPIRATION  ┌──────────┐    │
│     DATE        └──────────┘    │
│                                 │
│   * CONTRACTOR'S┌──────────┐    │
│     NAME        └──────────┘    │
│                                 │
│              ┌──────────────┐   │
│              │TO CONFIRMATION│  │
│              │   SCREEN     │   │
│              └──────────────┘   │
└─────────────────────────────────┘
```

FIG.8

```
┌─────────────────────────────────┐
│ ┌──────────────┬─────────────┐  │
│ │ http://BBB.jp/│ DETAILED   │  │──T10
│ │              │ INFORMA-   │  │
│ │              │ TION       │  │
│ ├──────────────┴─────────────┤  │
│                                 │
│        【AAA COMPANY】          │
│                                 │──13
│   CARD-NUMBER INPUTTING SCREEN  │
│                                 │
│   ┌─────────────────────────┐   │
│   │                         │   │
│   │ AAA COMPANY RELIES ON   │   │──T11
│   │ BBB COMPANY THAT        │   │
│   │ PROVIDES WEB FORM       │   │
│   │                         │   │
│   └─────────────────────────┘   │
│                                 │
│   * EXPIRATION  ┌──────────┐    │
│     DATE        └──────────┘    │
│                                 │
│   * CONTRACTOR'S┌──────────┐    │
│     NAME        └──────────┘    │
│                                 │
│              ┌──────────────┐   │
│              │TO CONFIRMATION│  │
│              │   SCREEN     │   │
│              └──────────────┘   │
└─────────────────────────────────┘
```

COMPUTER-READABLE RECORDING MEDIUM, TERMINAL DEVICE, AND TERMINAL CONTROLLING METHOD FOR DETERMINING SERVICE PROVIDER RELIABILITY

CROSS-REFERENCE TO RELATED APPLICATION

The present application claims priority to and incorporates by reference the entire contents, of Japanese Patent Application No. 2018-053521, filed in Japan on Mar. 20, 2018.

BACKGROUND

1. Field

Example implementations are directed to a computer-readable recording medium, a terminal device, and a terminal controlling method.

2. Related Art

According to a related art technology, a second provider supports a first provider in delivering a content so as to provide, as a service, the content (see Japanese Unexamined Patent Application Publication (Translation of PCT Application) No. 2017-515219, for example).

However, in the above-mentioned related art, a user receives, by the service of the second provider, provision of the content by the first provider, and thus the reliability of the service is significantly lowered.

SUMMARY

According to one aspect of an example implementation, a non-transitory computer-readable recording medium having stored therein a terminal controlling program (e.g., non-transitory computer readable medium including stored instructions executed by a microprocessor) that causes a computer to execute a process includes receiving, attempting, and determining. The receiving includes receiving, from a server of a second provider that provides a service for supporting a delivery of a content performed by a first provider, encrypted information along with the content. The first provider encrypts information on the service to obtain the encrypted information. The attempting includes attempting to decode the encrypted information, which is received in the receiving, by using a decoding key that is provided by the first provider. The determining includes determining reliability of the service based on a decoded result in the decoding.

The above and other objects, features, advantages and technical and industrial significance will be better understood by reading the following detailed description of example implementations, when considered in connection with the accompanying drawings.

BRIEF DESCRIPTION OF THE DRAWINGS

FIG. 6 is a sequence diagram illustrating one example of information processing to be executed by the information processing system according to the example implementation;

FIGS. 7 and 8 are diagrams illustrating examples of Web-form screens of the terminal device according to the example implementation.

DETAILED DESCRIPTION

Hereinafter, a mode (hereinafter, may be referred to as "example implementation") for executing a computer-readable recording medium, a terminal device, and a terminal controlling method according to the present application will be specifically explained with reference to accompanying drawings. Moreover, an example implementation described below is merely one example, and not intended to limit the computer-readable recording medium, the terminal device, and the terminal controlling method according to the present application. Note that in the following example implementation, common parts are represented with the same symbols and the description is omitted appropriately.

1. Outline of Information Processing

Figure 1:
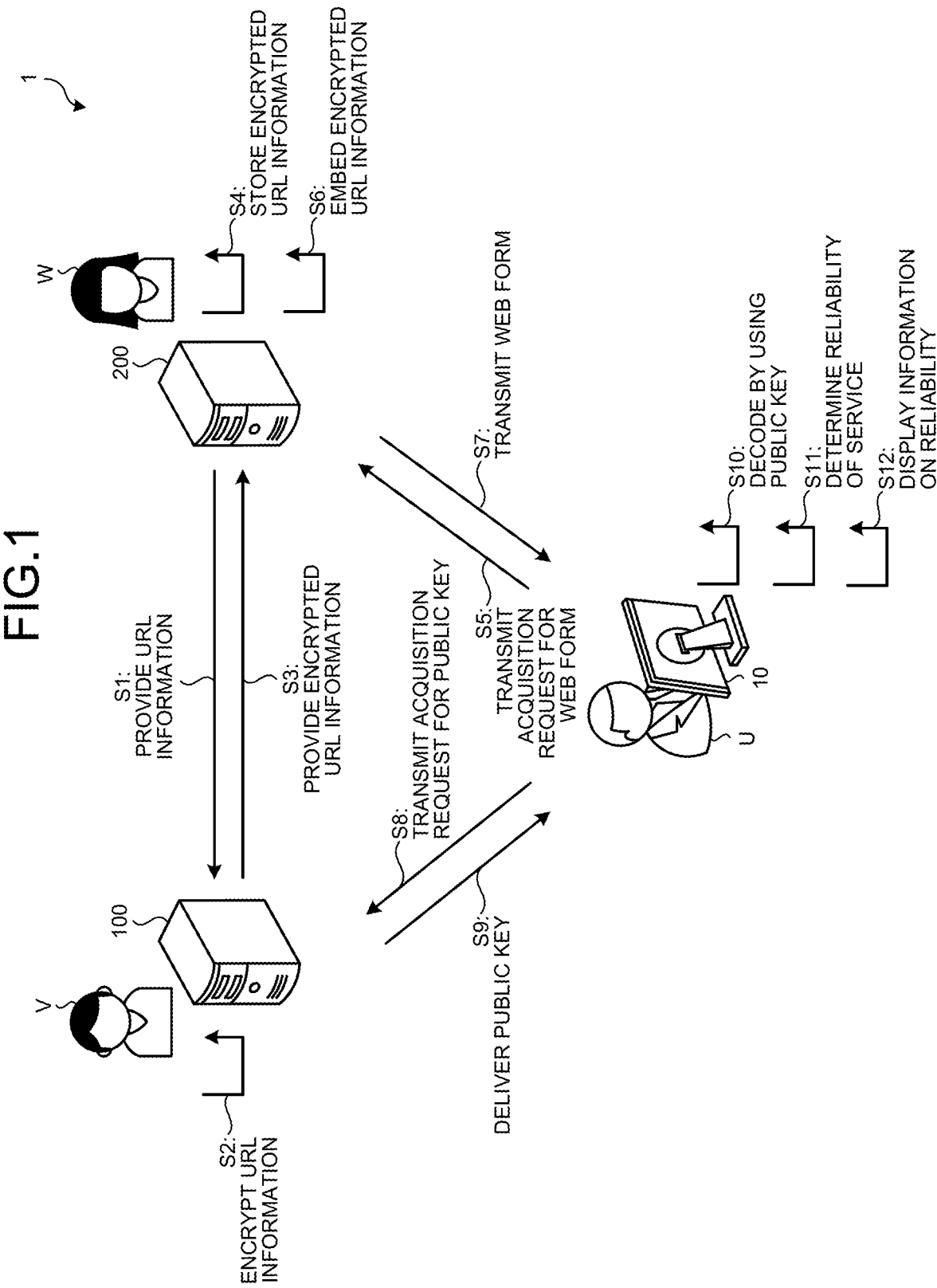
FIG. 1 is a diagram illustrating the outline of information processing according to an example implementation.

The outline of information processing according to an example implementation will be explained with reference to FIG. 1. FIG. 1 is a diagram illustrating the outline of the information processing according to the example implementation. In FIG. 1, one example of processing will be explained in which a service providing server 200, managed by a second provider, supports delivery of a content, stored in a content delivery server 100 managed by a first provider, and a terminal device 10 receives a provision service of the content by this support.

To use a content of the first provider, a user U is to access the service providing server 200, managed by the second provider, and receive a provision service of the content of the first provider from the service providing server 200.

Therefore, the user U receives, by the service performed by the second provider, the provision of the content by the first provider, and thus the reliability of the related art service is substantially lowered.

The terminal device 10 according to the present application executes a process as disclosed below for guaranteeing, to the user U, the reliability of the service. Hereinafter, a flow of the information processing to be executed by the terminal device 10 will be explained with reference to FIG. 1.

As illustrated in FIG. 1, a system operator W of the second provider, which manages the service providing server 200, previously provides Uniform Resource Locator information (URL information) of the service providing server 200 to a system operator V of the first provider, which manages the content delivery server 100 (S1). As such a provision method, for example, URL information of the service providing server 200 may be transmitted from a terminal, used by the system operator W of the second provider, to a terminal, used by the system operator V of the first provider, so as to provide the URL information.

Next, the system operator V of the first provider encrypts, by using a secret key of the content delivery server 100, the provided URL information of the service providing server 200 (S2). The system operator V of the first provider issues a public key corresponding to this secret key, in accordance with the encryption of the URL information using the secret key. The issued public key is stored in a storage 120 (see FIG. 4) of the content delivery server 100.

The system operator V of the first provider provides the encrypted URL information to the system operator W of the second provider (S3). As such a provision method, similarly to the aforementioned, for example, the encrypted URL information may be transmitted from a terminal used by the system operator V of the first provider to a terminal used by the system operator W of the second provider so as to provide the encrypted URL information. The system operator W of the second provider stores the encrypted URL information in a storage 220 (see FIG. 5) of the service providing server 200 (S4).

The above-mentioned processes from S1 to S4 are processes executed before the terminal device 10 receives, by the service performed by the second provider, the provision of the content by the first provider. In other words, the encryption process of the URL information of the service providing server 200 is previously executed between the system operator V of the first provider and the system operator W of the second provider.

Subsequently, the terminal device 10 transmits, to the service providing server 200 that supports the delivery of the content, an acquisition request for a Web form that is the content of the first provider (S5).

In response to the acquisition request transmitted from the terminal device 10, the service providing server 200 embeds the encrypted URL information in a communication protocol that is used between the terminal device 10 and the service providing server 200 (S6). Next, the service providing server 200 transmits, to the terminal device 10, a HyperText Transfer Protocol response (HTTP response) including the Web form that is the content of the first provider (S7). HEADER information of this HTTP includes the encrypted URL information that is information guaranteed by the first provider.

Subsequently, the terminal device 10 receives, from the service providing server 200, the HTTP response including the Web form, and causes a display 13 (see FIG. 3) to display the Web form. The terminal device 10 transmits, in accordance with an operation of the user U, an acquisition request for the public key to the content delivery server 100 (S8).

In response to the acquisition request transmitted from the terminal device 10, the content delivery server 100 delivers the issued public key (S9).

Subsequently, the terminal device 10 receives the public key, and decodes, on the basis of the HEADER information of HTTP and by using the received public key, the encrypted URL information embedded in the communication protocol that is used between the terminal device 10 and the service providing server 200 (S10).

The terminal device 10 outputs a result of whether or not the URL information of the received Web form and the decoded URL information coincide with each other, so as to determine the reliability of the service provided to the service providing server 200 (S11).

When determining that the URL information of received Web form and the decoded URL information coincide with each other, the terminal device 10 causes the display 13 to display information indicating the fact that the first provider relies on the second provider (S12). Such a display of information on the reliability will be mentioned later with reference to FIG. 8.

As described above, the terminal device 10 receives, along with a Web form, encrypted URL information from the service providing server 200 of the second provider that provides a service for supporting the delivery of content by the first provider. Moreover, the terminal device 10 outputs a result of whether or not the URL information of received Web form and the URL information decoded by using the public key coincide with each other, and when they coincide with each other, causes the display 13 to display information on the reliability.

Thus, the terminal device 10 guarantees the reliability of the service, to the user U that receives a provision service of a content of the first provider from the service providing server 200.

A display, indicating this fact, on the screen certifies that the first provider relies on the second provider, and thus the user U is able to realize that a service is provided from the proper first provider, which is desired by the user U, via the second provider, even when using a Web form provided by the second provider.

2. Configuration Example of Information Processing System

Figure 2:
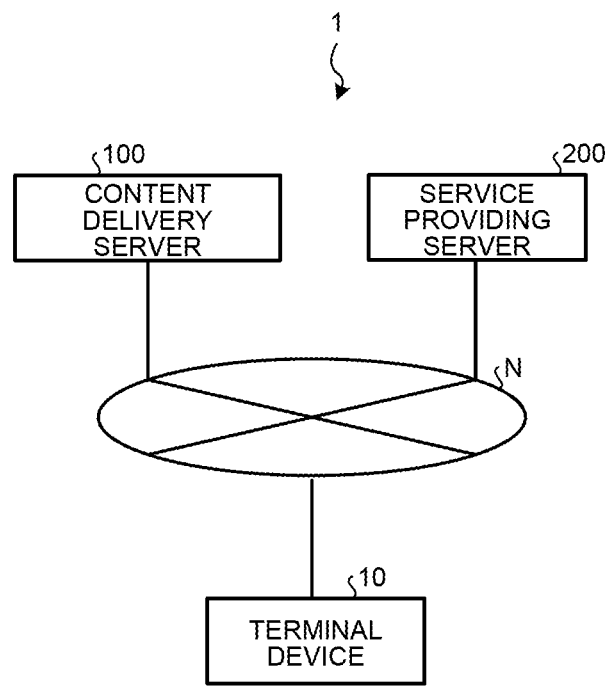
FIG. 2 is a diagram illustrating a configuration example of an information processing system according to the example implementation.

Next, a configuration of an information processing system 1 according to the example implementation will be explained with reference to FIG. 2. FIG. 2 is a diagram illustrating a configuration example of the information processing system 1 according to the example implementation.

As illustrated in FIG. 2, the information processing system 1 includes the terminal device 10, the content delivery server 100, and the service providing server 200.

The terminal device 10, the content delivery server 100, and the service providing server 200 are connected to one another via a network N. The network N includes a communication network such as a Local Area Network (LAN), a Wide Area Network (WAN), a telephone network (mobile phone network, land-line phone network, etc.), an area Internet Protocol (IP) network, and the Internet. The network N may include a wired network, or may include a wireless network.

The terminal device 10 is an information processing apparatus that is used by the user U. The terminal device 10 includes a smartphone, a desktop Personal Computer (PC), a laptop PC, a tablet terminal, a mobile phone, a Personal Digital Assistant (PDA), a Wearable Device, or the like. The terminal device 10 transmits, in response to an operation of the user U, an acquisition request for a Web form that is a content of the first provider to the service providing server 200. Moreover, the terminal device 10 transmits, in response to the operation of the user U, an acquisition request for a public key to the content delivery server 100.

The content delivery server 100 is a server that delivers a content stored therein. In the present example implementation, the content delivery server 100 delivers, to the service providing server 200, content stored therein to receive a service for supporting a delivery of the content.

The service providing server 200 provides a service for supporting a delivery of content. In the present example implementation, the service providing server 200 provides a service for supporting a delivery of a content stored in the content delivery server 100.

2-1. Configuration Example of Terminal Device

Figure 3:
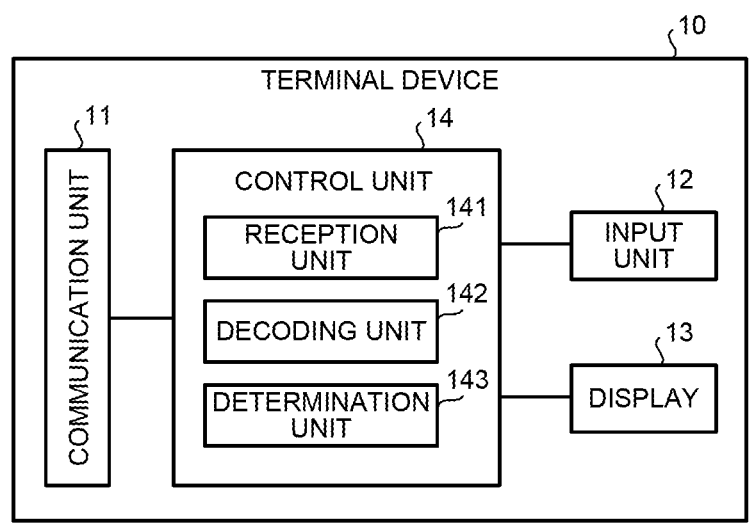
FIG. 3 is a diagram illustrating a configuration example of a terminal device according to the example implementation.

Next, the terminal device 10 according to the example implementation will be explained with reference to FIG. 3. FIG. 3 is a diagram illustrating a configuration example of the terminal device 10 according to the example implementation. As illustrated in FIG. 3, the terminal device 10 includes a communication unit 11, an input unit 12, the display 13, and a control unit 14.

The communication unit 11 is realized by using a Network Interface Card (NIC), for example. The communication unit 11 is connected to the network N in a wired or wireless manner so as to transmit and receive information between the terminal device 10 and the content delivery server 100, and between the terminal device 10 and the service providing server 200.

The input unit 12 is an input device that receives various operates from the user U. For example, the input unit 12 is realized by using a keyboard, a mouse, operation keys, etc. The display 13 is a display that displays various kinds of information. For example, the display 13 is realized by a liquid crystal display or the like. When a touch panel is employed for the terminal device 10, the input unit 12 and the display 13 are integrated with each other.

The control unit 14 is a controller, and a Central Processing Unit (CPU), a Micro Processing Unit (MPU), an Application Specific Integrated Circuit (ASIC), a Field Programmable Gate Array (FPGA), or the like executes, by using a storage area such as a random access memory (RAM) as a work region, various programs (e.g., non-transitory computer readable medium including stored instructions executed by a microprocessor) stored in a storage arranged in the terminal device 10 so as to realize the controller.

In the example illustrated in FIG. 3, the control unit 14 includes a reception unit 141, a decoding unit 142, and a determination unit 143. The control unit 14 realizes or executes functions and actions of information processing to be mentioned later. The inner configuration of the control unit 14 is not limited to that illustrated in FIG. 3, and may be another configuration, as long as the configuration is for executing the information processing disclosed herein.

The reception unit 141 receives, along with content, encrypted information obtained by encrypting information on a service by the first provider, from the service providing server 200 of the second provider that provides the service for supporting a delivery of the content performed by the first provider.

Specifically, the reception unit 141 receives, from the service providing server 200, a Web form that is a content of the first provider, and the URL information that is encrypted by using a secret key issued by the first provider. Furthermore, the reception unit 141 receives a public key that corresponds to the secret key delivered from the content delivery server 100.

The decoding unit 142 attempts decoding, by using a decoding key provided by the first provider, the encrypted information received by the reception unit 141. Specifically, the decoding unit 142 decodes, by using the received public key, the encrypted URL information embedded in the communication protocol that is used between the terminal device 10 and the service providing server 200.

The determination unit 143 determines, on the basis of the decoded result by the decoding unit 142, the reliability of the service. Specifically, the determination unit 143 determines whether or not the URL information of received Web form and the decoded URL information coincide with each other.

When determining that the service is determined to be reliable, the determination unit 143 causes the display 13 to display information on the reliability. Specifically, when determining that the URL information of received Web form and the decoded URL information coincide with each other, the determination unit 143 causes the display 13 to display information indicating the fact that the first provider relies on the second provider.

2-2. Configuration Example of Content Delivery Server

Figure 4:
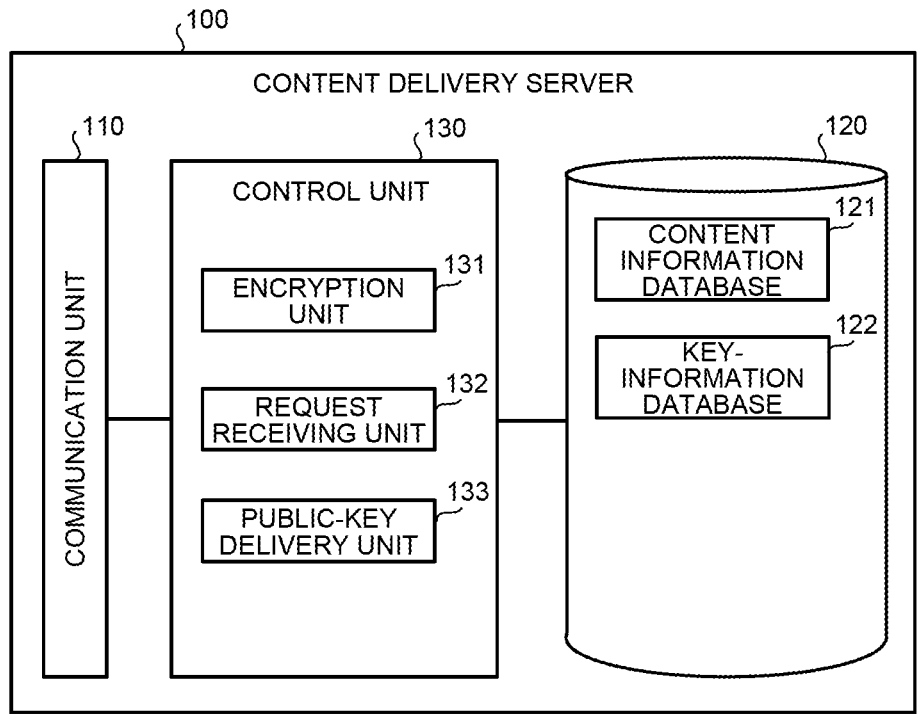
FIG. 4 is a diagram illustrating a configuration example of a content delivery server according to the example implementation.

Next, the content delivery server 100 according to the example implementation will be explained with reference to FIG. 4. FIG. 4 is a diagram illustrating a configuration example of the content delivery server 100 according to the example implementation. As illustrated in FIG. 4, the content delivery server 100 includes a communication unit 110, the storage 120, and a control unit 130.

The communication unit 110 is realized by using an NIC, for example. The communication unit 110 is connected to the network in a wired or wireless manner. The storage 120 is realized by a semiconductor memory element such as a RAM and a flash memory; and/or a storage such as a hard disk and an optical disk.

As illustrated in FIG. 4, the storage 120 includes a content information database 121 and a key-information database 122. The content information database 121 is a database that stores therein various kinds of content information to be delivered via the Internet. The key-information database 122 is a database that stores therein a public key issued in accordance with encryption of URL information using a secret key.

The control unit 130 is a controller, and a Central Processing Unit (CPU), a Micro Processing Unit (MPU), an Application Specific Integrated Circuit (ASIC), a Field Programmable Gate Array (FPGA), or the like executes, by using a storage area such as a random access memory (RAM) as a work region, various programs (corresponding to one example of information processing program) stored in a storage arranged in the content delivery server 100 so as to realize the controller. In the example illustrated in FIG. 4, the control unit 130 includes an encryption unit 131, a request receiving unit 132, and a public-key delivery unit 133.

The encryption unit 131 encrypts URL information of the service providing server 200 by using a secret key. The request receiving unit 132 receives an acquisition request for a public key, which is issued by the terminal device 10.

The public-key delivery unit 133 delivers, in response to the acquisition request transmitted from the terminal device 10, the secret key stored in the key-information database 122.

2-3. Configuration Example of Service Providing Server

Figure 5:
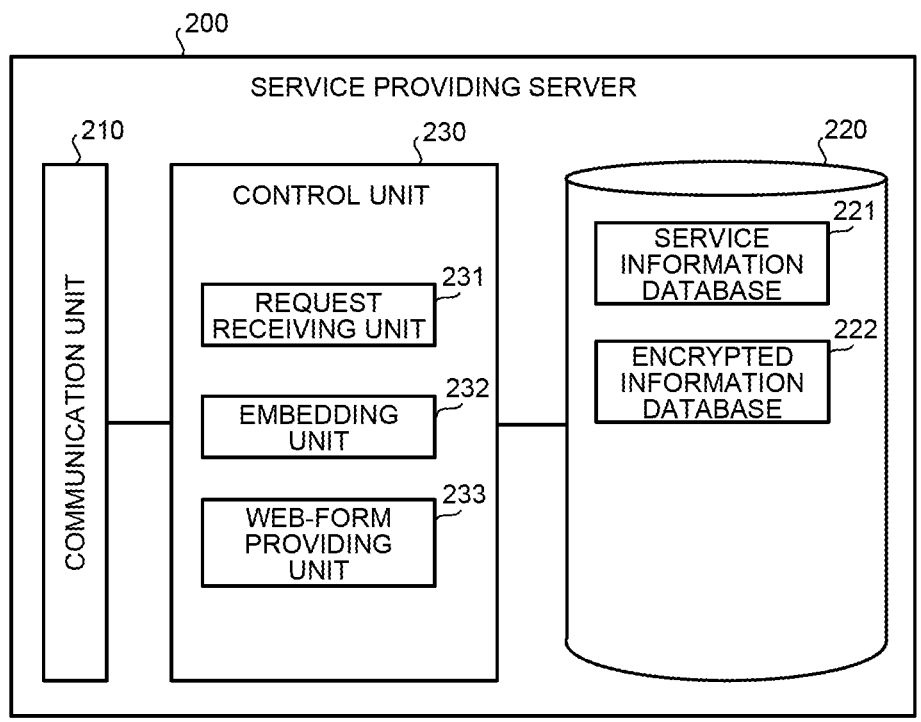
FIG. 5 is a diagram illustrating a configuration example of a service providing server according to the example implementation.

Next, the service providing server 200 according to the example implementation will be explained with reference to FIG. 5. FIG. 5 is a diagram illustrating a configuration example of the service providing server 200 according to the example implementation. As illustrated in FIG. 5, the service providing server 200 includes a communication unit 210, the storage 220, and a control unit 230.

The communication unit 210 is realized by using an NIC, for example. The communication unit 210 is connected to the network in a wired or wireless manner. The storage 220 is realized by a semiconductor memory element such as a RAM and a flash memory; and/or a storage such as a hard disk and an optical disk. As illustrated in FIG. 5, the storage 220 includes a service information database 221 and an encrypted information database 222. The service information database 221 is a database that stores therein service information of the first provider to be supported when a delivery of the content is supported. The encrypted information database 222 is a database that stores therein the URL information of the service providing server 200, which is encrypted by the first provider.

The control unit 230 is a controller, and a Central Processing Unit (CPU), a Micro Processing Unit (MPU), an Application Specific Integrated Circuit (ASIC), a Field Programmable Gate Array (FPGA), or the like executes, by using a storage area such as a random access memory (RAM) as a work region, various programs (e.g., corresponding to one example of information processing program) stored in a storage arranged inside of the service providing server 200 so as to realize the controller. In the example illustrated in FIG. 5, the control unit 230 includes a request receiving unit 231, an embedding unit 232, and a Web-form providing unit 233.

The request receiving unit 231 receives, from the terminal device 10, an acquisition request for a Web form that is a content of the first provider. The embedding unit 232 embeds, in response to an acquisition request transmitted from the terminal device 10, the URL information encrypted by the first provider in a communication protocol used between the terminal device 10 and the service providing server 200.

The Web-form providing unit 233 provides, in response to the acquisition request transmitted from the terminal device 10, a Web form that is a content of the first provider.

3. Example of Actions and Effects of Information Processing

Next, details of the information processing to be executed by each of the processing units 141 to 143 will be explained with reference to FIG. 6. FIG. 6 is a sequence diagram illustrating an example of information processing to be executed by the information processing system 1 according to the example implementation.

In the following information processing, it is understood that the encryption process of URL information of the service providing server 200 is previously executed between the system operator V of the first provider and the system operator W of the second provider, as described in the above-mentioned S1 to S3.

As illustrated in FIG. 6, the terminal device 10 transmits an acquisition request for a Web form that is a content of the first provider, to the service providing server 200 that supports a delivery of the content (S101).

In response to the acquisition request transmitted from the terminal device 10, the service providing server 200 embeds the URL information encrypted by the first provider, which is stored in the encrypted information database 222, in a communication protocol used between the terminal device 10 and the service providing server 200 (S102).

Subsequently, in response to the acquisition request transmitted from the terminal device 10, the service providing server 200 transmits, to the terminal device 10, an HTTP response including a Web form that is the content of the first provider (S103). Note that HEADER information of this HTTP includes the encrypted URL information that is information guaranteed by the first provider.

The terminal device 10 receives, from the service providing server 200, the HTTP response including the Web form, which is the content of the first provider, and causes the display 13 to display the Web form (S104).

Herein, a case will be disclosed with reference to FIG. 7 in which the display 13 of the terminal device 10 displays a Web form that is a content of the first provider, which is transmitted from the service providing server 200. FIG. 7 is a diagram illustrating one example of a Web-form screen of the terminal device 10 according to the example implementation.

As illustrated in FIG. 7, in the present example, the display 13 displays thereon "card-number inputting screen" of "AAA company", and further displays thereon "http://BBB.jp/" in its URL displaying field.

Thus, in the present example, a domain name (http://BBB.jp/), which is different from that of "AAA company", is displayed in the URL displaying field, and thus the reliability of the service provided from "BBB company" that manages the service providing server 200 is determined.

Specifically, the user U provides an input to (e.g., touches, by using his/her finger), a displayed button T10 of "details information" that is arranged in parallel with the URL displaying field in the Web-form screen, for example. The terminal device 10 transmits, caused by this user input such as a touch, an acquisition request for a public key to the content delivery server 100 (S105).

In response to the acquisition request transmitted from the terminal device 10, the content delivery server 100 delivers the public key stored in the key-information database 122 (S106).

Subsequently, the terminal device 10 receives the public key, and decodes, on the basis of HEADER information of the HTTP and by using the received public key, the encrypted URL information embedded in a communication protocol that is used between the terminal device 10 and the service providing server 200 (S107).

The terminal device 10 outputs a result of whether the URL information of received Web form (http://BBB.jp/) and the decoded URL information coincide with each other, so as to determine the reliability of a service for the service providing server 200 (S108).

When determining that the URL information of received Web form (http://BBB.jp/) and the decoded URL information coincide with each other, the terminal device 10 causes the display 13 to display, for example, information indicating the fact that "company AAA" relies on "company BBB", which is information on the reliability (S109).

Herein, a case will be explained with reference to FIG. 8 in which the display 13 of the terminal device 10 displays information on the reliability in a Web form that is a content of the first provider, which is transmitted from the service providing server 200. FIG. 8 is a diagram illustrating an example of a Web-form screen of the terminal device 10 according to the example implementation.

As illustrated in FIG. 8, in the present example, when determining that the URL information of received Web form (http://BBB.jp/) and the decoded URL information coincide with each other, the display 13 displays information T11 indicating the fact that "AAA company relies on BBB company that provides Web form" so that the information T11 overlays "card-number inputting screen". In other words, when determining that the URL information of received Web form (http://BBB.jp/) and the decoded URL information coincide with each other, the screen illustrated in FIG. 7 is changed into the screen illustrated in FIG. 8.

Thus, the user U is able to trust that the Web form provided by the BBB company is associated with the AAA company, and thus is able to safely input personal information into the "card-number inputting screen". When the user touches the information T11 by using his/her finger, the display of the information T11 is deleted from the screen, and then is able to input his/her personal information into "card-number inputting screen".

4. Other Disclosures

Among the processes having already been explained in the above-mentioned example implementation, all or a part of them, which are explained to be manually executed, may be automatically executed by using a well-known method. Moreover, the processing procedures, the specific appellations, and the information including various data and parameters, which are aforementioned and/or illustrated, are appropriately changed if not otherwise specified. For example, the various kinds of information is not limited to illustrated information.

In other words, specific forms of distribution and integration of the illustrated configuration elements are not limited to those illustrated in the drawings, and all or some of the devices can be configured by separating or integrating the apparatus functionally or physically in any unit, according to various types of loads, the status of use, etc.

In the above-mentioned example implementation, the terminal device 10 realizes and executes functions and actions of the information processing; however, the content delivery server 100 or the service providing server 200 may have the functions and actions of the information processing, which the terminal device 10 has, so as to realize and execute the functions and actions of the information processing of the terminal device 10.

Any of the processes described in the above-mentioned example implementation may be incorporated with each other within a consistent range with respect to processing details.

For example, the terminal device 10 may be realized by using a plurality of server computers, or realized by invoking, depending on function, an external platform and the like by using an Application Programming Interface (API), network computing, etc. Namely, the configuration of the terminal device 10 may be flexibly modified.

5. Hardware Configuration

Figure 9:
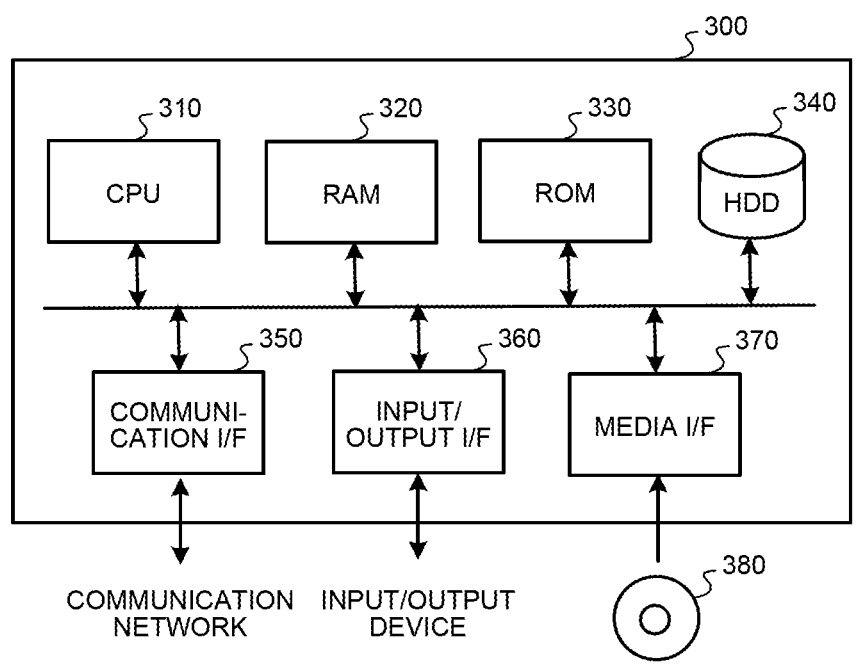
FIG. 9 is a diagram illustrating a hardware configuration of one example of a computer that realizes functions of the terminal device.

The above-mentioned terminal device 10 according to the example implementation is realized by using, for example, a computer 300 having a configuration illustrated in FIG. 9. Hereinafter, the terminal device 10 is exemplified. FIG. 9 is a diagram illustrating a hardware configuration of one example of the computer 300 that realizes functions of the terminal device 10. The computer 300 includes a CPU 310, a RAM 320, a ROM 330, an HDD 340, a communication interface (I/F) 350, an input/output interface (I/F) 360, and a media interface (I/F) 370.

The CPU 310 operates on the basis of programs (e.g., non-transitory computer readable medium including stored instructions executed by a microprocessor) stored in the ROM 330 or the ROM 330, so as to control the various units. The ROM 330 stores therein a boot program that is to be executed by the CPU 310 at a start-up of the computer 300, programs that depend on hardware of the computer 300, etc.

The HDD 340 stores therein programs (e.g., non-transitory computer readable medium including stored instructions executed by a microprocessor) to be executed by the CPU 310, data to be used by the programs, and the like. The communication interface 350 receives, via the network N, data from another device and transmits the data to the CPU 310, and further transmits, via the network N, data generated by the CPU 310 to another device.

The CPU 310 controls, via the input/output interface 360, output devices such as a display and a printer, and input devices such as a keyboard and a mouse. The CPU 310 acquires, via the input/output interface 360, data from the input devices. The CPU 310 outputs, via the input/output interface 360, generated data to the output devices.

The media interface 370 reads out a program (e.g., non-transitory computer readable medium including stored instructions executed by a microprocessor) or data stored in a recording medium 380, and provides it to the CPU 310 via the RAM 320. The CPU 310 loads the provided program from the recording medium 380 onto the RAM 320 via the media interface 370, and executes the loaded program. The recording medium 380 may be an optical recording medium such as a Digital Versatile Disk (DVD) and a Phase change rewritable Disk (PD), a magnetooptical recording medium such as a Magneto Optical disk (MO), a tape medium, a magnetic recording medium, and a semiconductor memory.

For example, when the computer 300 functions as the terminal device 10 according to the example implementation, the CPU 310 of the computer 300 executes a program (e.g., non-transitory computer readable medium including stored instructions executed by a microprocessor), which is loaded on the RAM 320, so as to realize a function of the control unit 14. The HDD 340 stores therein data that is stored in a storage (not illustrated). The CPU 310 of the computer 300 reads from the recording medium 380 and executes these read programs; however, these programs may be acquired from another device via the network N in another example.

6. Effects

As described above, a non-transitory computer-readable recording medium having stored therein a terminal controlling program (e.g., non-transitory computer readable medium including stored instructions executed by a microprocessor) that causes a computer to execute a process including: receiving, from a server of a second provider that provides a service for supporting a delivery of a content performed by a first provider, encrypted information along with the content, the first provider encrypting information on the service to obtain the encrypted information; attempting decoding the encrypted information, which is received in the receiving, by using a decoding key that is provided by the first provider; and determining reliability of the service based on a decoded result in the decoding. Thus, it is possible to guarantee, to a user who is to receive a provision service of a content of the first provider, the reliability of the service.

The terminal controlling program according to the example implementation causes the computer to execute a process further including: when determining that the service is reliable in the determining, displaying information on the reliability. Thus, it is possible to guarantee, to a user who is to receive a provision service of a content of the first provider, the reliability of the service.

Furthermore, the displaying includes displaying, as the information on the reliability, information indicating that the first provider relies on the second provider. Thus, a user is able to trust that the content provided by the second provider is associated with the first provider.

Furthermore, the receiving includes receiving encrypted information that is encrypted by using a secret key issued by the first provider, and the decoding includes attempting decoding by using a public key that corresponds to the secret key provided by the first provider. Thus, it is possible to more reliably guarantee, to a user who is to receive a provision service of a content of the first provider, the reliability of the service.

Furthermore, the receiving includes receiving, as the encrypted information encrypted by the first provider, Uniform Resource Locator (URL) information of the server of the second provider. Thus, it is possible to cause a terminal device to receive URL information of the server of the second provider, which is encrypted by the first provider.

Furthermore, the determining includes determining whether or not decoded information decoded in the decoding coincides with the received URL information of the server of the second provider. Thus, it is possible to cause a terminal device to determine whether or not the decoded information coincides with the received URL information of the server of the second provider.

The terminal device 10 according to the example implementation includes the reception unit 141, the decoding unit 142, and the determination unit 143. The reception unit 141 receives, from a server of a second provider that provides a service for supporting a delivery of a content performed by a first provider, encrypted information along with the content. The first provider encrypts information on the service to obtain the encrypted information. The decoding unit 142 attempts decoding the encrypted information, which is received by the reception unit 141, by using a decoding key provided by the first provider. The determination unit 143 determines reliability of the service on the basis of a decoded result by the decoding unit 142. Thus, the terminal device 10 according to the example implementation is capable of guaranteeing, to a user who is to receive a provision service of the content performed by the first provider, the reliability of the service.

Although the example implementations have been described with respect to specific example implementations for a complete and clear disclosure, the appended claims are not to be thus limited but are to be construed as embodying all modifications and alternative constructions that may occur to one skilled in the art that fairly fall within the basic teaching herein set forth.

The above "section, module, or unit" may be replaced by "means", "circuit", or the like. For example, a decoding unit may be replaced by any of a decoding means and a decoding circuit.

According to one aspect of the example implementation, it is possible to guarantee, to a user, the reliability of a service.

Although the present disclosure has been described with respect to specific example implementations for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium having stored therein terminal controlling instructions comprising:

transmitting a request for content to a server of a second provider that provides a service for supporting delivery of content stored at a first provider;

in response to the request, receiving the content with encrypted information from the server of the second provider, wherein, prior to transmission of the request for content, the encrypted information is obtained by the server of the second provider from the first provider based on the first provider encrypting the content to generate the encrypted information;

attempting to decode the received encrypted information by using a decrypting key that is provided by the first provider; and determining the first provider relies on the service provided by the second provider based on a decoded result in the decoding.

2. The non-transitory computer-readable recording medium according to claim 1, further comprising:

when determining that the first provider relies on the service in the determining, providing information on the reliance.

3. The non-transitory computer-readable recording medium according to claim 2, wherein the providing includes displaying, as the information on the reliance, information indicating that the first provider relies on the second provider.

4. The non-transitory computer-readable recording medium according to claim 1, wherein the receiving includes receiving encrypted information that is encrypted by using a secret key issued by the first provider, and the attempting decoding includes attempting decoding by using a public key that corresponds to the secret key provided by the first provider.

5. The non-transitory computer-readable recording medium according to claim 1, wherein the receiving includes receiving, as the encrypted information encrypted by the first provider, Uniform Resource Locator (URL) information of the server of the second provider.

6. The non-transitory computer-readable recording medium according to claim 5, wherein the determining includes determining whether decoded information decoded in the decoding coincides with the received URL information of the server of the second provider.

7. A terminal device comprising:

a controller that transmits a request for content to a server of a second provider that provides a service for supporting delivery of content stored at a first provider;

the controller that receives the content with encrypted information from the server of the second provider, wherein, prior to transmission of the request for content, the encrypted information is obtained by the server of the second provider from the first provider based on the first provider encrypting the content to generate the encrypted information;

the controller that attempts to decode the received encrypted information by using a decrypting key provided by the first provider; and the controller that determines the first provider relies on the service provided by the second based on a decoded result by the controller.

8. The terminal device according to claim 7, wherein when the controller determines that the first provide relies on the service in the determining, information is provided on the reliance.

9. The terminal device according to claim 8, further comprising a display that displays, as the information on the reliance from the controller, information indicating that the first provider relies on the second provider.

10. The terminal device according to claim 7, wherein
the controller receiving includes the controller receiving encrypted information that is encrypted by using a secret key issued by the first provider, and
the attempting decoding includes attempting decoding by using a public key that corresponds to the secret key provided by the first provider.

11. The terminal device according to claim 7, wherein
the controller receives, as the encrypted information encrypted by the first provider, Uniform Resource Locator (URL) information of the server of the second provider.

12. The terminal device according to claim 11, wherein the controller determines whether decoded information decoded in the decoding coincides with the received URL information of the server of the second provider.

13. A terminal controlling method to be executed by a computer, the method comprising:
transmitting a request for content to a server of a second provider that provides a service for supporting delivery of content stored at a first provider;
in response to the request, receiving the content with encrypted information from the server of the second provider, wherein, prior to transmission of the request for content, the encrypted information is obtained by the server of the second provider from the first provider based on the first provider encrypting the content to generate the encrypted information;
attempting to decode the received encrypted information by using a decrypting decoding key that is provided by the first provider; and
determining the first provider relies on the service provided by the second provider based on a decoded result in the decoding.

14. The terminal controlling method according to claim 13, further comprising:
when determining that the first provider relies on the service in the determining, providing information on the reliance.

15. The terminal controlling method according to claim 14, wherein
the providing includes displaying, as the information on the reliance, information indicating that the first provider relies on the second provider.

16. The terminal controlling method according to claim 13, wherein
the receiving includes receiving encrypted information that is encrypted by using a secret key issued by the first provider, and
the attempting decoding includes attempting decoding by using a public key that corresponds to the secret key provided by the first provider.

17. The terminal controlling method according to claim 13, wherein
the receiving includes receiving, as the encrypted information encrypted by the first provider, Uniform Resource Locator (URL) information of the server of the second provider.

18. The terminal controlling method according to claim 17, wherein
the determining includes determining whether decoded information decoded in the decoding coincides with the received URL information of the server of the second provider.

* * * * *